United States Patent
Arai et al.

(10) Patent No.: US 7,911,890 B2
(45) Date of Patent: Mar. 22, 2011

(54) OPTICAL DISK UNIT

(75) Inventors: Akihiro Arai, Kyoto (JP); Takeharu Yamamoto, Osaka (JP)

(73) Assignee: Panasonic Corporation, Osaka (JP)

(*) Notice: Subject to any disclaimer, the term of this patent is extended or adjusted under 35 U.S.C. 154(b) by 198 days.

(21) Appl. No.: 12/066,869

(22) PCT Filed: Sep. 13, 2006

(86) PCT No.: PCT/JP2006/318144
§ 371 (c)(1),
(2), (4) Date: Sep. 15, 2008

(87) PCT Pub. No.: WO2007/032381
PCT Pub. Date: Mar. 22, 2007

(65) Prior Publication Data
US 2009/0010118 A1   Jan. 8, 2009

(30) Foreign Application Priority Data

Sep. 14, 2005  (JP) .............................. 2005-266529

(51) Int. Cl.
G11B 7/00 (2006.01)

(52) U.S. Cl. ............... 369/44.25; 369/44.37; 369/44.29; 369/53.28

(58) Field of Classification Search .............. 369/44.29, 369/44.32, 47.14, 53.28, 44.25, 44.27, 44.35, 369/44.37, 44.41
See application file for complete search history.

(56) References Cited

U.S. PATENT DOCUMENTS

| 6,400,664 | B1 | 6/2002 | Shimano et al. | |
| 7,016,269 | B2* | 3/2006 | Ogasawara et al. | 369/44.25 |
| 2002/0089905 | A1* | 7/2002 | Miyazaki et al. | 369/44.23 |

FOREIGN PATENT DOCUMENTS

| JP | 63-244321 | | 10/1988 |
| JP | 04-178924 | | 6/1992 |
| JP | 04178924 | A * | 6/1992 |
| JP | 05-334688 | | 12/1993 |
| JP | 08-077569 | | 3/1996 |
| JP | 08077569 | A * | 3/1996 |
| JP | 09-231583 | | 9/1997 |
| JP | 2002-150570 | | 5/2002 |
| JP | 2002150570 | A * | 5/2002 |
| JP | 2002190132 | A * | 7/2002 |
| JP | 2004-063073 | | 2/2004 |

OTHER PUBLICATIONS

International Search Report for corresponding Application No. PCT/JP2006/318144 dated Oct. 17, 2006.
Form PCT/ISA/237 and partial English translation.

* cited by examiner

*Primary Examiner* — Thang V Tran
*Assistant Examiner* — Brenda Bernardi
(74) *Attorney, Agent, or Firm* — Renner, Otto, Boisselle & Sklar, LLP

(57) ABSTRACT

An optical disc drive includes: an optical branching element for splitting light from a light source into main and sub-beams; a condenser element for condensing the main and sub-beams; a photodetector section including photodetectors to receive reflected portions of the main and sub-beams, each photodetector having photosensitive areas, each of which outputs a signal representing the intensity of light received there; and a computing section for generating a first focus signal, representing where the focal point of the main beam is located with respect to the storage layer, based on the reflected light of the main beam, and a second focus signal based on the reflected light of the main and sub-beams.

8 Claims, 6 Drawing Sheets

OPTICAL PICKUP 110 / ODC 120

FIG.5
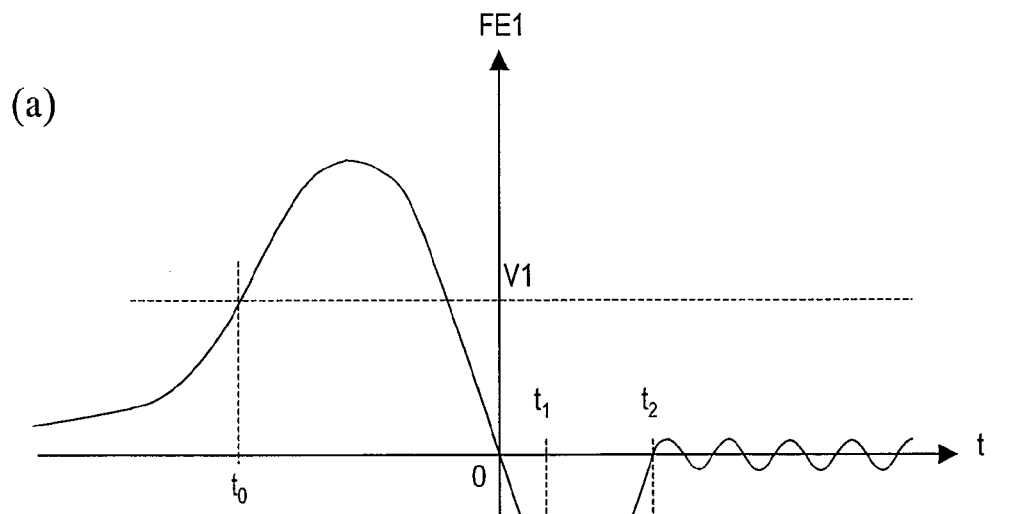
(a)
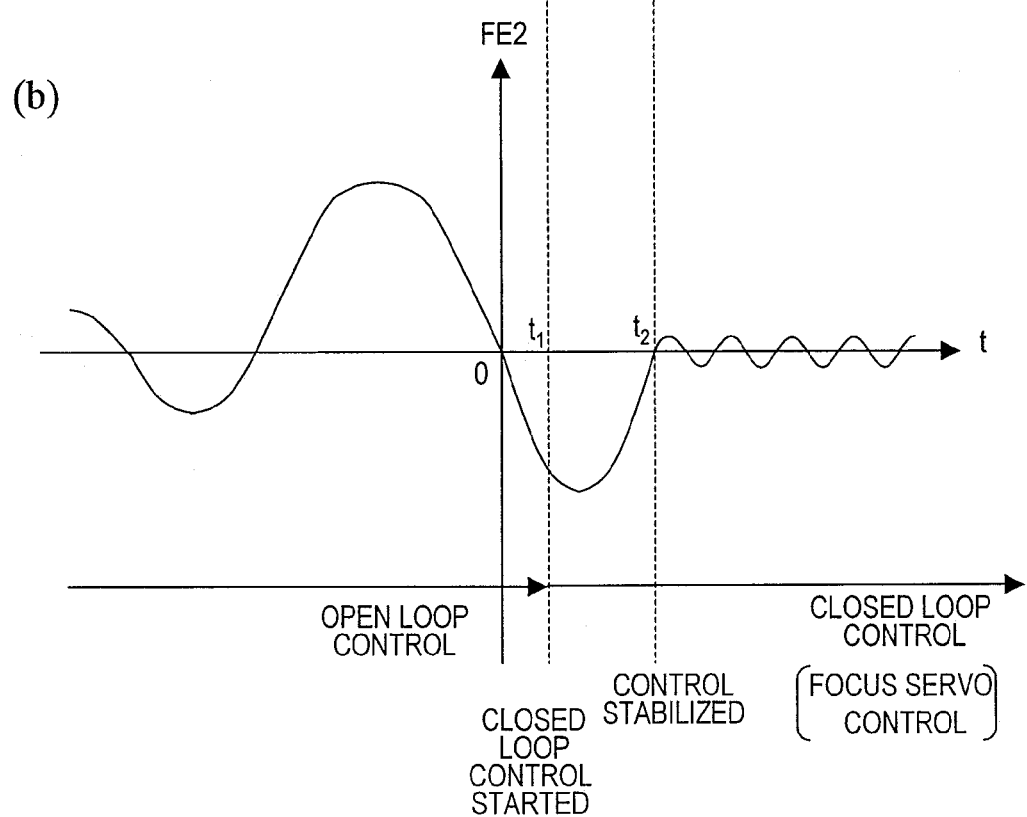
(b)

US 7,911,890 B2

OPTICAL DISK UNIT

TECHNICAL FIELD

The present invention relates to a focus servo control technique for an optical disc drive that reads and/or writes information optically from/on an information storage medium such as an optical disc.

BACKGROUND ART

To make the focal point of a light beam follow a target track on a storage layer of an optical disc that is rotating at a predetermined velocity, a tracking error signal representing the magnitude of a tracking error and a focus error signal representing the magnitude of a focus error need to be generated based on the light beam that has been reflected from the optical disc.

Various methods for generating a focus error signal have been developed so far. But to perform a focus control with precision, an accurate focus error signal containing little disturbance signals should be generated. For example, Patent Document No. 1 discloses a technique for minimizing the intrusion of optical modulation components, which would be caused by a guide groove on the track of an optical disc, in a focus error signal.

Specifically, the optical disc drive disclosed in Patent Document No. 1 detects focus errors by generating focus error signals on three light beams that have been focused on an optical disc and subjects these three focus error signals to a predetermined computation, thereby obtaining focus error signals for use to perform a focus control. As a result, a highly accurate signal, in which the optical modulation components have been canceled, can be obtained.

The optical disc drive includes a tracking detecting section of a differential push-pull (DPP) type and a focus detecting section that adopts an astigmatism method. The focus detecting section and the tracking detecting section generate a focus error signal and a tracking error signal, respectively, based on the output signals of a photodetector section.

FIG. 7 shows a configuration for a conventional photodetector section 60, which includes three photodetectors 61, 62 and 63. The quadruple photodetectors 61 and 63 receive two of three light beams at their quadruple areas, while the quadruple photodetector 62 receives the main beam at its quadruple areas. In FIG. 7, the reference signs a through l denote the respective photosensitive areas of the quadruple photodetectors. If the signals detected at the respective areas are identified by the reference signs of those areas, the focus error signal FE can be given by the following equation.

$$FE = a-b+c-d+G(e-f+g-h+i-j+k-l) \quad (1)$$

(G is Predetermined Constant.)

To perform a DPP type tracking detection, the optical pickup is designed such that the phase of a push-pull signal detected from the main beam is different by 180 degrees from that of a push-pull signal detected from the two sub-beams. That is why by multiplying the focus error signal of each beam (e.g., the focus error signal of the main beam is a−b+c−d) by a predetermined constant and then adding the products together as in Equation (1), the push-pull signals (i.e., optical modulation signals caused by the guide groove) can be canceled from the focus error signal FE. As a result, the signal FE can be a highly accurate control signal.

On the other hand, in the optical disc drive disclosed in Patent Document No. 2, the control section monitors the level of the focus error signal FE and starts shifting the focal point provided that the FE signal that has exceeded a first setting is lower than a second setting. As a result, even if the optical disc has significant disc flutter, the focal point can still be shifted steadily to a focus controllable range.

Patent Document No. 1: Japanese Patent Application Laid-Open Publication No. 2004-63073 (pages 8 to 9 and FIGS. 2 and 4)

Patent Document No. 2: Japanese Patent Application Laid-Open Publication No. 8-77569 (pages 3 to 4 and FIGS. 1 and 2)

DISCLOSURE OF INVENTION

Problems to be Solved by the Invention

In the conventional optical pickup such as that disclosed in Patent Document No. 1, however, if the magnitude of focus error is significant, then the main beam may enter the quadruple photodetectors that should receive the sub-beams. As a result, the focus error signal may have decreased accuracy. If the focus error signal had low accuracy, it would be difficult to shift the focal point steadily to the focus controllable range. In that case, the problem could not be overcome even by the technique disclosed in Patent Document No. 2.

This problem will be described in further detail. FIG. 8 shows the shape of a main beam spot 70 that will be formed on the photodetector section 60 when the magnitude of focus error is relatively large. The respective photodetectors are identified by the same reference numerals as those used in FIG. 7.

According to the technique of detecting a focus by the astigmatism method, if the main beam has a significant focus error, the main beam spot 70 on the photodetector section 60 will have an elliptical shape with its axis tilted by 45 degrees. In that case, the main beam spot 70 will cover not only most of the sub-beam receiving areas h and j but also parts of the photosensitive areas e and k as well as shown in FIG. 8.

In Equation (1), the signals h and j have the same negative sign and the signals e and k have the same positive sign. For that reason, even if these values were substituted into Equation (1), unwanted components of the main beam could not be canceled and the output signal would have an offset.

FIG. 9 shows the waveform of a focus error signal FE that has been disturbed by the intrusion of the main beam, which has produced pseudo-peak portions 80 on this waveform. That is to say, the pseudo-peak portions 80 have been produced because the signal has been disturbed by the offset that was caused by the intrusion of the main beam. The pseudo-peak portions form peaks that are similar to those of the original S-curve.

Such pseudo-peak portions 80 are produced noticeably if the optical system that leads the light reflected from the optical disc to the photodetector section has a low magnification (i.e., the magnification between the light beam spot as an object point and a conjugate image point near the photodetector section). This is because if the magnification is low, the space between the respective quadruple photodetectors for detecting the main beam and sub-beams becomes so narrow that the main beam that still has high optical density would be incident on the sub-beam receiving areas before the main beam expands greatly.

In addition, as long as a focus error signal with such a waveform is used, it is impossible to shift the focal point to the focus controllable range steadily by the conventional method. The reason is as follows.

The voltage values V1 and V2 shown in FIG. 9 are the first and second settings disclosed in Patent Document No. 2. If a focus search operation is carried out such that the objective lens is once moved toward the optical disc and then away from the optical disc, then the magnitude of focus error will start tracing the waveform shown in FIG. 9 from the negative domain.

If the level of the focus error signal once increases beyond V1 and then decreases below V2, then the focal point can be shifted steadily toward the origin where the magnitude of focus error, which can be corrected by focus control, is zero.

However, if the optical disc had a significant disc flutter, the magnitude of focus error might change in the negative direction again after having exceeded the first setting V1 once. In that case, the signal FE would have a level that is lower than the second setting V2 at the pseudo-peak portion 80 of which the magnitude of focus error is negative. As a result, the focus control would be started at that position. At that point in time, however, the focal point is still a long way off the storage layer, and the focus control should fail.

In order to overcome the problems described above, the present invention has an object of providing an optical disc drive that can shift the focal point steadily to a focus controllable range even if the focus error signal has pseudo-peak portions.

Means for Solving the Problems

An optical disc drive according to the present invention includes: a light source; an optical branching element for splitting light emitted from the light source into a main beam and at least one sub-beam; a condenser element for condensing the main beam and the sub-beam; a photodetector section including a plurality of photodetectors to receive the main beam and the sub-beam, respectively, that have been reflected from a storage layer of an optical disc, each photodetector having a number of photosensitive areas, each of which outputs a signal representing the intensity of light received there; and a computing section for generating a first focus signal, representing where the focal point of the main beam is located with respect to the storage layer, based on the signals of the respective photosensitive areas that have received the reflected light of the main beam, and also generating a second focus signal based on the signals of the respective photosensitive areas that have received the reflected light of the main beam and the reflected light of the sub-beam. The optical disc drive performs a first type of control in order to shift the focal point to a focus controllable range that is defined with respect to the storage layer, and then performs a second type of control in order to make the focal point keep up with the storage layer. While performing the first type of control, the optical disc drive compares a level of the first focus signal to at least one reference value, changes the types of control from the first type into the second type based on a result of the comparison, and performs the second type of control based on the second focus signal.

The optical disc drive may further include: a control section for comparing the level of the first focus signal to the at least one reference value and giving an instruction to change into the second type of control based on a result of the comparison; and a focus servo section for changing the types of control to perform from the first type into the second type, and vice versa, in accordance with the instruction.

The at least one reference value may include a first reference value and a second reference value that is smaller than the first reference value. The control section may compare the level of the first focus signal to each of the first and second reference values.

When the level of the first focus signal that has once exceeded the first reference value decreases below the second reference value, the control section may give an instruction to change into the second type of control.

When the level of the first focus signal that has once decreased below the second reference value exceeds the first reference value, the control section may give an instruction to change into the second type of control.

The control section may give an instruction to perform the second type of control using the first focus signal right after the types of control have been changed into the second type and then give an instruction to perform the second type of control using the second focus signal.

After the second type of control using the first focus signal has stabilized, the control section may give the instruction to perform the second type of control using the second focus signal.

Another optical disc drive according to the present invention includes: a light source; an optical branching element for splitting light emitted from the light source into a main beam and at least one sub-beam; a condenser element for condensing the main beam and the sub-beam; a photodetector section including a plurality of photodetectors to receive the main beam and the sub-beam, respectively, that have been reflected from a storage layer of an optical disc, each photodetector having a number of photosensitive areas, each of which outputs a signal representing the intensity of light received there; and a computing section for generating a first focus signal, representing where the focal point of the main beam is located with respect to the storage layer, based on the signals of the respective photosensitive areas that have received the reflected light of the main beam, and also generating a second focus signal based on the signals of the respective photosensitive areas that have received the reflected light of the main beam and the reflected light of the sub-beam. The optical disc drive performs a first type of control in order to shift the focal point to a focus controllable range that is defined with respect to the storage layer, and then performs a second type of control in order to make the focal point keep up with the storage layer. After having changed the types of control to perform from the first type into the second one, the optical disc drive performs the second type of control based on the first focus signal and then performs the second type of control based on the second focus signal.

The optical disc drive may further include: a control section for comparing a level of the first focus signal to at least one reference value and giving an instruction to start performing the second type of control based on a result of the comparison; and a focus servo section for changing the types of control to perform from the first type into the second type, and vice versa, in accordance with the instruction.

The at least one reference value may include the first reference value and a second reference value that is smaller than the first reference value. The control section may compare the level of the first focus signal to each of the first and second reference values.

When the level of the first focus signal that has once exceeded the first reference value decreases below the second reference value, the control section may give an instruction to change into the second type of control.

When the level of the first focus signal that has once decreased below the second reference value exceeds the first reference value, the control section may give an instruction to change into the second type of control.

A processor according to the present invention is built in an optical disc drive. The drive includes: a light source; an optical branching element for splitting light emitted from the light source into a main beam and at least one sub-beam; a condenser element for condensing the main beam and the sub-beam; a photodetector section including a plurality of photodetectors to receive the main beam and the sub-beam, respectively, that have been reflected from a storage layer of an optical disc, each photodetector having a number of photosensitive areas, each of which outputs a signal representing the intensity of light received there; and a computing section for generating a first focus signal, representing where the focal point of the main beam is located with respect to the storage layer, based on the signals of the respective photosensitive areas that have received the reflected light of the main beam, and also generating a second focus signal based on the signals of the respective photosensitive areas that have received the reflected light of the main beam and the reflected light of the sub-beam. The optical disc drive performs a first type of control in order to shift the focal point to a focus controllable range that is defined with respect to the storage layer, and then performs a second type of control in order to make the focal point keep up with the storage layer. The processor performs the processing steps of: giving an instruction to perform the first type of control; comparing a level of the first focus signal to at least one reference value; and changing the types of control from the first type into the second type based on a result of the comparison, and giving an instruction to perform the second type of control based on the second focus signal.

Another processor according to the present invention is also built in an optical disc drive. The drive includes: a light source; an optical branching element for splitting light emitted from the light source into a main beam and at least one sub-beam; a condenser element for condensing the main beam and the sub-beam; a photodetector section including a plurality of photodetectors to receive the main beam and the sub-beam, respectively, that have been reflected from a storage layer of an optical disc, each photodetector having a number of photosensitive areas, each of which outputs a signal representing the intensity of light received there; and a computing section for generating a first focus signal, representing where the focal point of the main beam is located with respect to the storage layer, based on the signals of the respective photosensitive areas that have received the reflected light of the main beam, and also generating a second focus signal based on the signals of the respective photosensitive areas that have received the reflected light of the main beam and the reflected light of the sub-beam. The optical disc drive performs a first type of control in order to shift the focal point to a focus controllable range that is defined with respect to the storage layer, and then performs a second type of control in order to make the focal point keep up with the storage layer. The processor performs the processing steps of: giving an instruction to perform the first type of control; changing the types of control to perform from the first type into the second type and giving an instruction to perform the second type of control based on the first focus signal; and giving an instruction to change from the second type of control based on the first focus signal into the second type of control based on the second focus signal.

EFFECTS OF THE INVENTION

According to the present invention, while a first type of control is being performed to shift the focal point toward a target storage layer, the types of control are changed into a second type of control to make the focal point keep up with the storage layer in response to a first focus signal that has been generated based on the reflected light of a main beam. After that, the second type of control is performed in response to a second focus signal that has been generated based on the reflected light of the main beam and that of a sub-beam. Since the first focus signal has no pseudo-peak portions that the second focus signal has, the focal point can be shifted steadily to a range where the second type of control can be performed. And then the second type of control can be performed with high precision using the second focus signal. As a result, there is no need to design the optical system of an optical pickup so as to eliminate the pseudo peak portions. That is to say, the flexibility of design increases and the size of the optical pickup can be reduced easily.

Portions (a) and (b) of FIG. 5 show the waveforms of the focus error signals FE1 and FE2, respectively.

Figure 6:
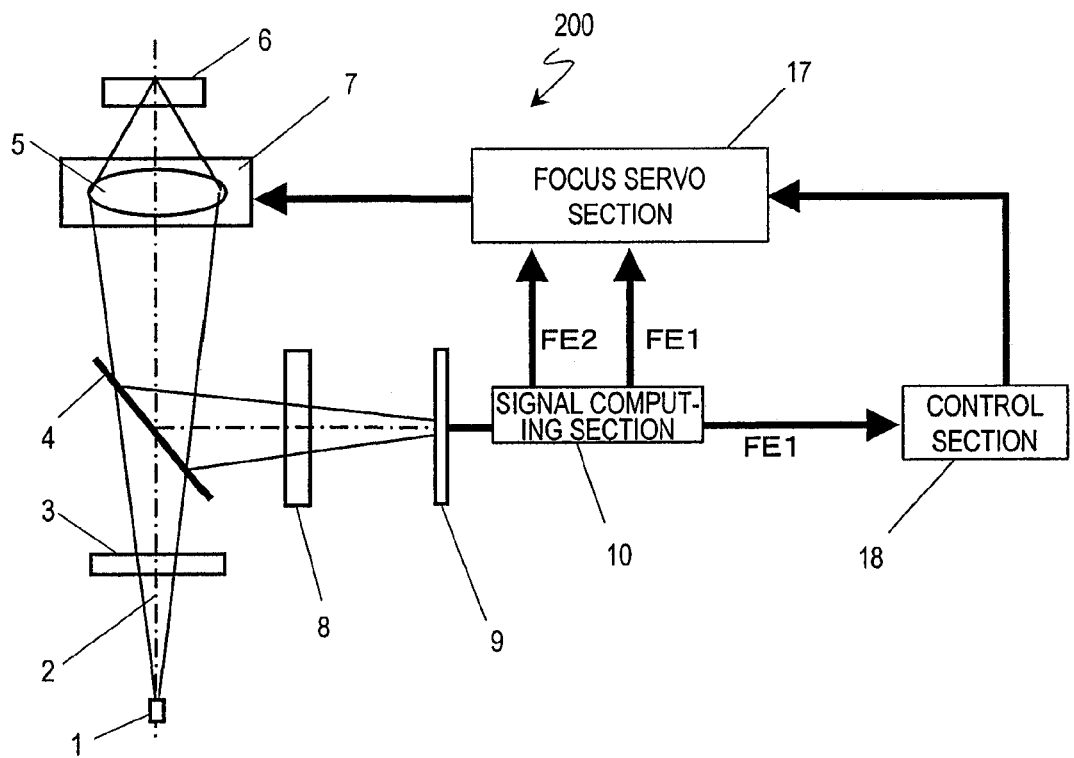

FIG. 6 shows a configuration for an optical disc drive 200 according to a second preferred embodiment of the present invention.

Figure 7:
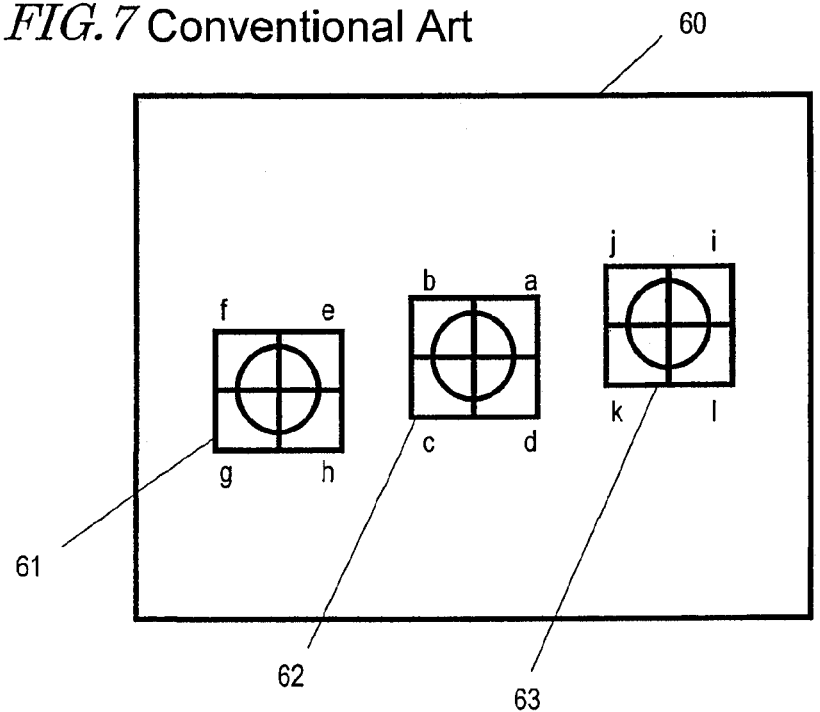

FIG. 7 shows a configuration for a conventional photodetector section 60.

Figure 8:
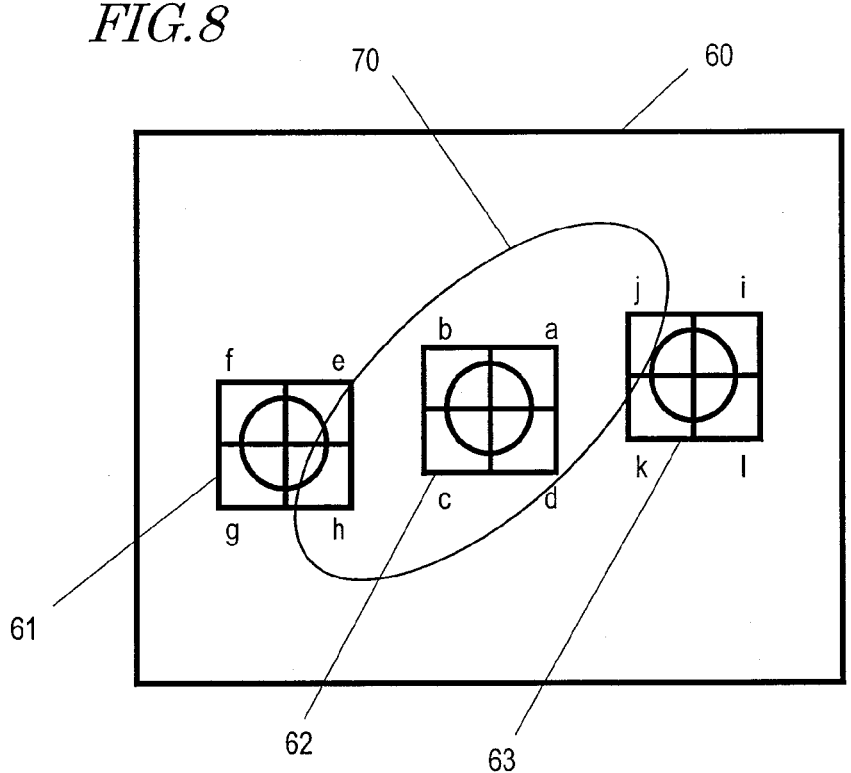

FIG. 8 shows the shape of a main beam spot 70 that will be formed on the photodetector section 60 when the magnitude of focus error is relatively large.

Figure 9:
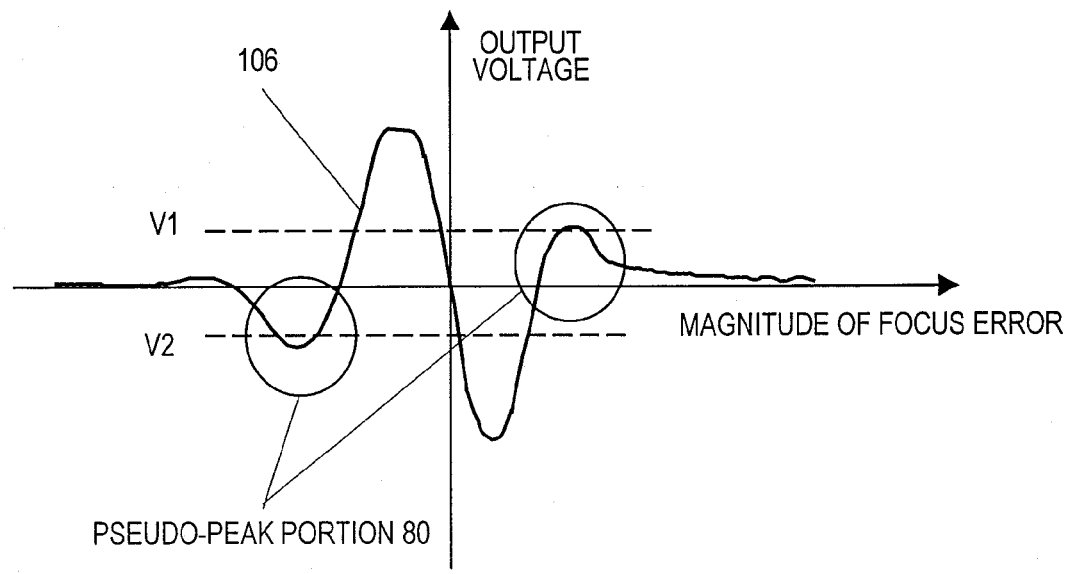

FIG. 9 shows the waveform of a focus error signal FE that has been disturbed by the intrusion of the main beam.

DESCRIPTION OF REFERENCE NUMERALS 1 light source
3 diffraction element
4 beam splitter
5 objective lens
7 actuator
8 detector lens
9 photodetector section
10 signal computing section
11 focus servo section
12 control section
100, 200 optical disc drive
110 optical pickup
120 optical disc controller (ODC)

BEST MODE FOR CARRYING OUT THE INVENTION

Hereinafter, preferred embodiments of the present invention will be described with reference to the accompanying drawings.

Embodiment 1

Figure 1:
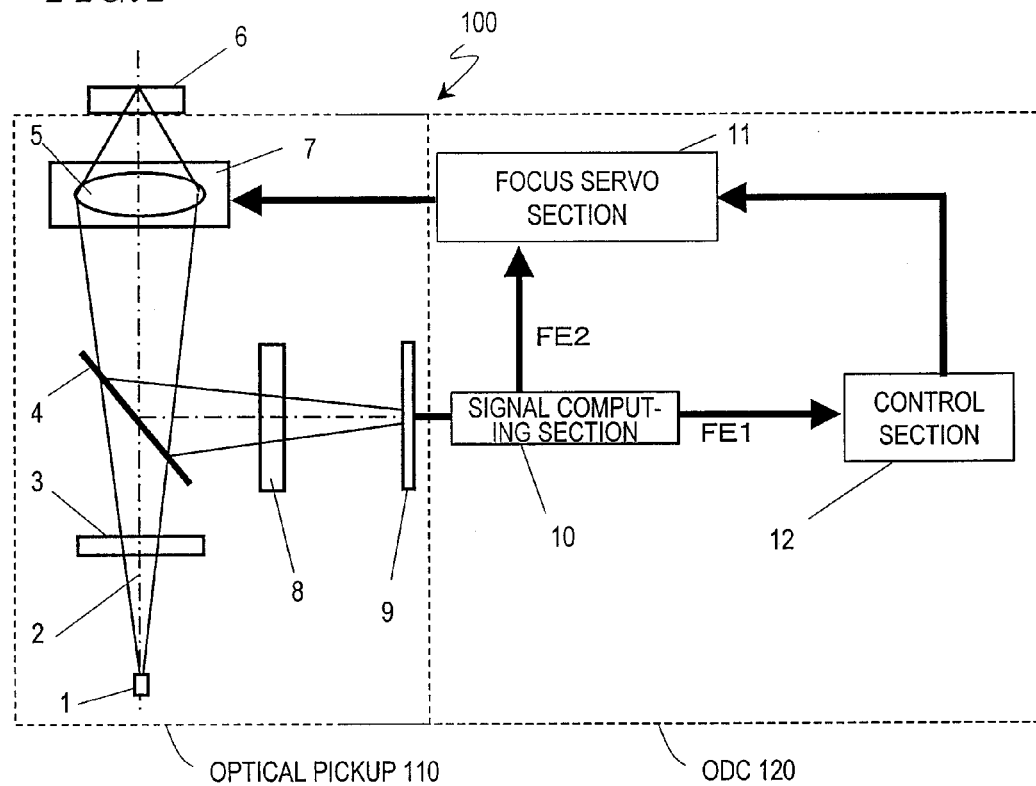
FIG. 1 shows a configuration for an optical disc drive 100 according to a first preferred embodiment of the present invention.

FIG. 1 shows a configuration for an optical disc drive 100 according to a preferred embodiment of the present invention. The optical disc drive 100 includes an optical pickup 110 and an optical disc controller (ODC) 120. Although not shown in FIG. 1, the optical disc drive 100 further includes a spindle motor for rotating an optical disc 6 and other components.

The optical pickup 110 radiates a laser beam toward the optical disc 6, receives the light that has been reflected from the optical disc 6 and then outputs a signal representing the intensity of the reflected light.

The optical pickup 110 includes a light source 1, a diffraction element 3 as an optical branching filter, a beam splitter 4, an objective lens 5, an actuator 7, a detector lens 8 and a photodetector section 9. In FIG. 1, the one-dot chain 2 that runs from the light source 1 to the optical disc 6 indicates the optical axis of the optical system of the optical pickup 110.

The ODC 120 reads and/or writes data from/on the optical disc 6 while performing servo controls such as a focus control and a tracking control in accordance with the output signal of the optical pickup 110 that represents the intensity of the reflected light. Since the present invention is mainly related to a focus control technique, only components that are required to get the focus control done are shown in FIG. 1.

The ODC 120 includes a signal computing section 10, a focus servo section 11 and a control section 12. The signal computing section 10 performs predetermined computations on the light intensity signal supplied from the photodetector section 9. The control section 12 controls the focus servo section 11. Specifically, in accordance with the instruction given by the control section 12, the focus servo section 11 controls the voltage applied to the actuator 7, thereby driving the objective lens 5 perpendicularly to the data side (storage layer) of the optical disc 6. In this manner, a focus servo operation is realized. It should be noted that FEE and FE2 shown in FIG. 1 are reference signs to denote signals.

Each component of the ODC 120 may be implemented on a circuit chip either by itself or in combination with at least one more component thereof. For example, the control section 12 may be implemented either as a dedicated processor or as a combination of a general-purpose processor and a computer program stored in a memory (not shown) to perform the processing to be described below. Optionally, the functions of the signal computing section 10 and the focus servo section 11 may be incorporated into any of these types of processors.

First, it will be described where the light travels in the optical disc drive 100. The light emitted from the light source 1 is split by the diffraction element 3 into a main beam and two sub-beams. Thereafter, the respective beams are transmitted through the beam splitter 4 and then condensed by the objective lens 5 through the transparent substrate of the optical disc 6 onto the storage layer, thereby forming three light beam spots there. The light beams reflected from the optical disc 6 (i.e., both the main beam and the sub-beams) are transmitted through the objective lens 5 again and incident on the beam splitter 4. The light beams reflected from the beam splitter 4 are given astigmatism by passing through the detector lens 8 and then led to the photodetector section 9.

The detector lens 8 gives astigmatism to the light passing there. This astigmatism is needed to perform a focus control by the so-called "astigmatism method".

Figure 2:
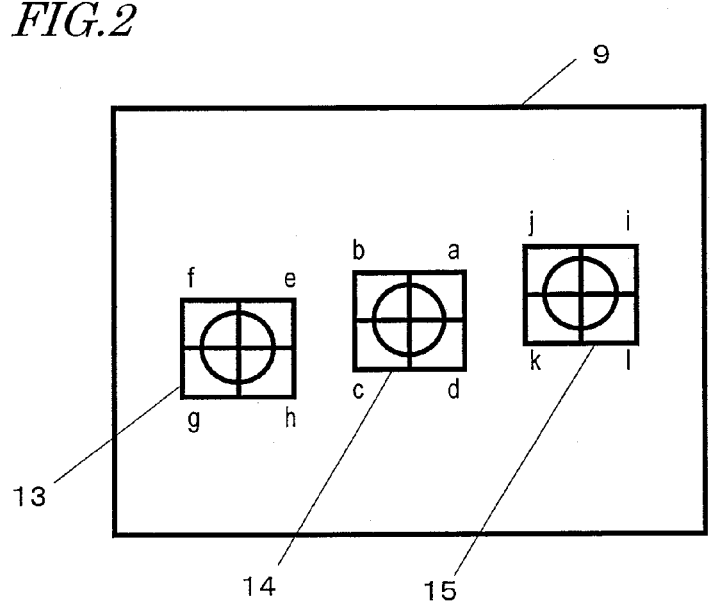
FIG. 2 shows respective photodetectors 13, 14 and 15 included in the photodetector section 9.

Hereinafter, the photodetector section 9 will be described in detail. FIG. 2 shows the respective photodetectors 13, 14 and 15 included in the photodetector section 9. The quadruple photodetectors 13 and 15 receive two of three light beams at their quadruple areas, while the quadruple photodetector 14 receives the main beam at its quadruple areas. In FIG. 2, the reference signs a through 1 denote the respective photosensitive areas of the quadruple photodetectors.

The light intensity signals generated by the photodetector section 9 are input to the signal computing section 10. Based on the light intensity signals that have been supplied from the respective divided areas of the photodetector section 9, the signal computing section 10 generates a focus error signal FE1 representing the position of the focal point of the main beam with respect to the storage layer, i.e., the magnitude of focus error with respect to the storage layer. Also, based on the light intensity signals, the signal computing section 10 subjects signals, representing the magnitudes of focus errors of the respective light beam spots of the main and sub-beams, to a predetermined computation, thereby figuring out and outputting a second focus error signal FE2. If the signals detected at the respective photosensitive areas shown in FIG. 2 are identified by the reference signs of those areas, the focus error signals FE1 and FE2 can be given by the following equations.

$$FE1 = a - b + c - d$$

$$FE2 = a - b + c - d + G(e - f + g - h + i - j + k - l)$$

(G is predetermined constant.) The signal FE2 is a signal with high control precision, in which the optical modulation components, caused by the guide groove on the track, have been reduced.

The focus control is carried out to make the focal point of the light beam keep up with the target storage layer of the optical disc 6. To perform the focus control, first, the optical disc drive 100 applies a voltage to the actuator 7 by an open loop control, thereby shifting the focal point to the vicinity of the zero-cross point of the focus error signal FE1 (i.e., to the vicinity of the target storage layer), or to the range where the focus control can be performed easily. In this case, the "range where the focus control can be performed easily" is determined by the specifications of the optical pickup 110 when the optical disc drive 100 is shipped, for example. When the focal point reaches the focus controllable range, the optical disc drive 100 closes the focus servo loop, thereby performing a closed loop control.

As used herein, the "open loop control" refers to a mode of control in which the focus servo section 11 applies a variable voltage to the actuator 7 and drives the objective lens 5 in accordance with the instruction given by the control section 12 and in which the control signal obtained as a result (i.e., the focus error signal FE1 in this preferred embodiment) is monitored by the control section 12.

On the other hand, the closed loop control refers herein to a mode of control in which the focus servo section 11 applies a voltage to the actuator 7 in accordance with the instruction given by the control section 12 and further varies the voltage to be applied to the actuator 7 so as to reduce the control signal generated as a result (i.e., the focus error signal FE2 in this preferred embodiment) to zero.

In performing the open loop control described above, the timing to start applying the voltage to the actuator 7 is specified by the control section 12. The modes of controls are also changed from the open loop control into the closed loop control in accordance with the instruction given by the control section 12.

The optical disc drive 100 of this preferred embodiment is partly characterized in that the control section 12 determines, by the level of the focus error signal FE1, whether or not the focal point has reached the focus controllable range while performing the open loop control and instructs to change the modes of control into the closed loop control the instant the focal point reaches the focus controllable range. This processing will be described in further detail later.

When the focal point reaches the focus controllable range, the control section 12 instructs the focus servo section 11 to make the focal point keep up with the storage layer using the focus error signal FE2. In response, the focus servo section 11 controls the voltage applied to the actuator 7 so as to reduce the focus error signal FE2 to zero.

Hereinafter, it will be described in further detail with reference to FIGS. 3 to 5 how the optical disc drive 100 operates.

Figure 3:
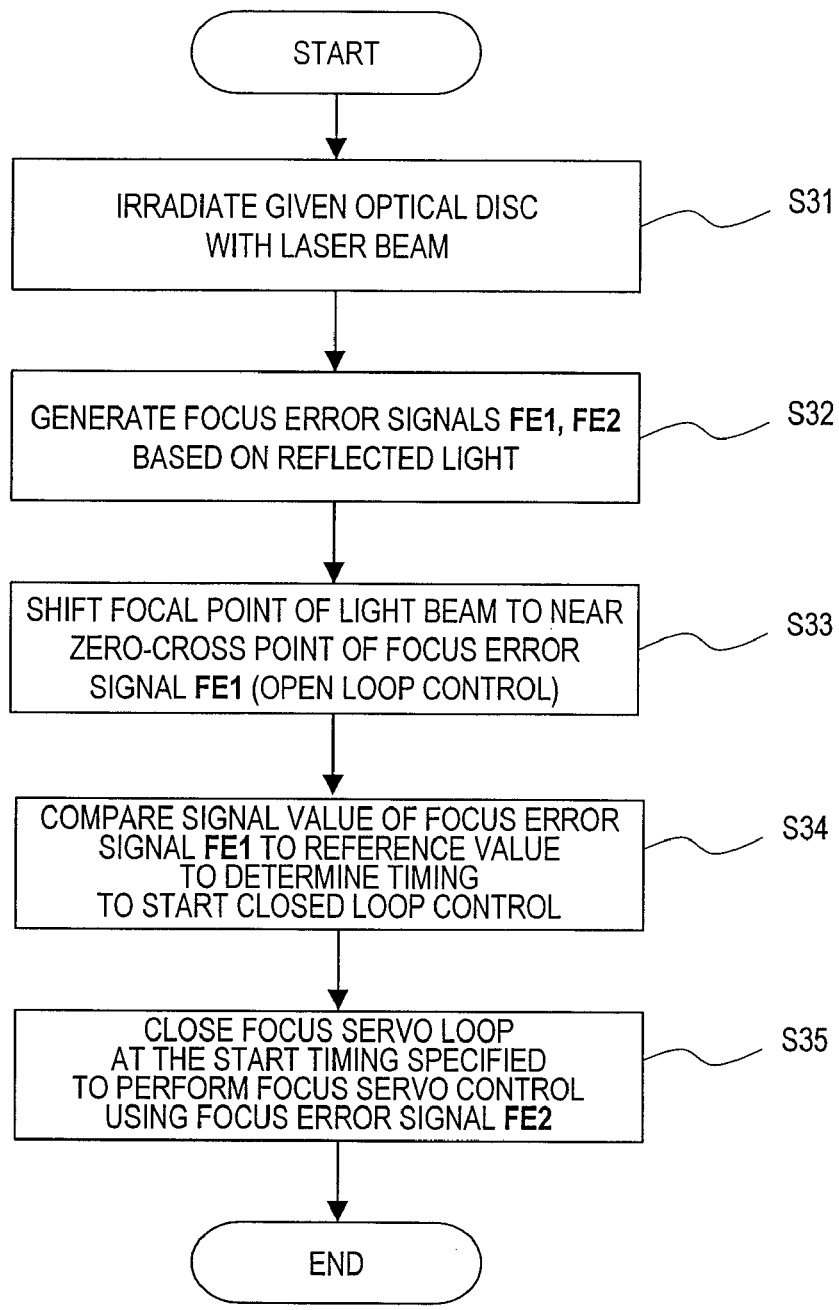
FIG. 3 is a flowchart showing the procedure of processing performed by the optical disc drive 100.

FIG. 3 shows the procedure of processing performed by the optical disc drive 100. First, in Step S31, the optical pickup 110 irradiates the optical disc 6, which is now loaded in the optical disc drive 100, with a laser beam.

Next, in Step S32, based on the output signals of the photodetector section 9 that has received the reflected light, the signal computing section 10 generates focus error signals FE1 and FE2.

Then, in Step S33, the control section 12 controls the voltage applied to the actuator 7, thereby shifting the focal point of the light beam to the vicinity of the zero-cross point of the focus error signal FE1. This focus position control is the open loop control.

Subsequently, in Step S34, the control section 12 compares the signal value of the focus error signal FE1 to a reference value, thereby determining the timing to start the closed loop control (i.e., the timing to switch the modes of control from the open loop control into the closed loop control).

One of the features of the optical disc drive 100 of this preferred embodiment lies in the operation in this processing step S34. This feature will be described in further detail. FIG. 4 shows the waveform 16 of the focus error signal FE1. In FIG. 4, the abscissa represents the magnitude of focus error, the ordinate represents the signal level and V1 and V2 denote first and second reference values, respectively.

Figure 4:
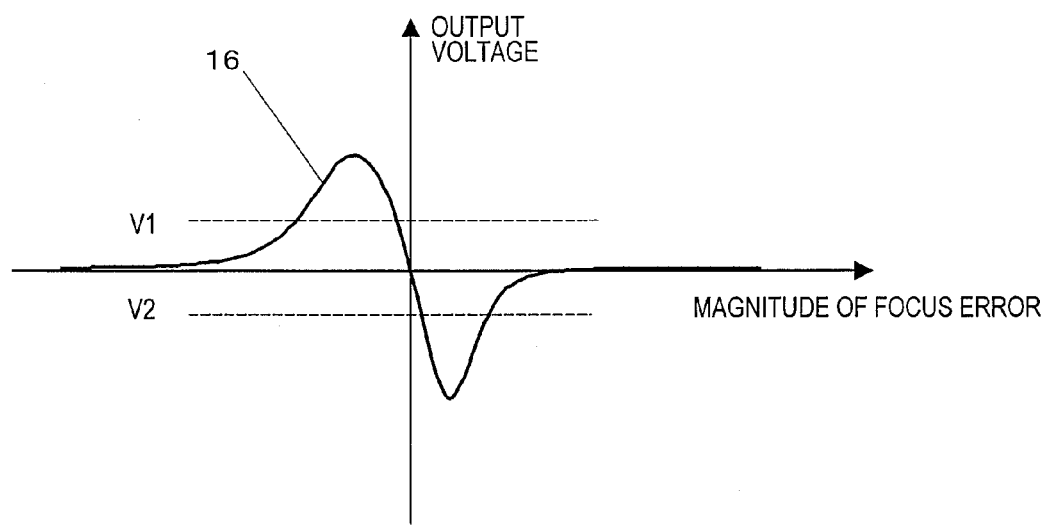
FIG. 4 shows the waveform 16 of the focus error signal FE1.

The waveform 16 of the focus error signal FE1 shown in FIG. 4 has no pseudo-peaks that are seen in the waveform of the focus error signal FE2 (see FIG. 9). That is why if the timing to start the closed loop control is determined using the focus error signal FE1 with no pseudo-peaks, the timing is not affected at all by the presence of pseudo-peaks in the focus error signal FE2.

Using the focus error signal FE1, the timing to start the closed loop control may be determined in the following manner. Specifically, when the focus error signal FE1 that has reached a local maximum value comes to have a signal level that is lower than V1, the closed loop control is started. Alternatively, when the focus error signal FE1 that has reached a local minimum value comes to have a signal level that is higher than V2, the closed loop control is started.

It should be noted that light intensity components resulting from the sub-beams could be included in the focus error signal FE1. However, the influence of such components is negligible. This is because the intensity of a sub-beam is normally defined to be one-tenth or less of that of a main beam.

Look at FIG. 3 again. In Step S35, the control section 12 instructs the focus servo section 11 to change the modes of control from the open loop control into the closed loop control at the specified timing. The operation of changing the modes of control from the open loop control into the closed loop control is the operation of "closing the focus servo loop", so to speak. The focus servo section 11 starts the closed loop control (i.e., the focus servo control) using the focus error signal FE2 as a control signal.

Various other methods may be used to determine the timing to start the closed loop control in the processing step S34.

For example, the focus error signal FE1 may be sequentially compared to the two reference values V1 and V2 at some interval and the timing to start the closed loop control may be determined based on a result of the comparison. As a first example, when the focus error signal FE1 that has once increased beyond the first setting V1 that is higher than the reference voltage decreases below the second setting that is lower than the reference voltage, the control section 12 may instruct the focus servo section 11 to start the closed loop control. As a second example, when the focus error signal FE1 that has once decreased below the second setting V2 that is lower than the reference voltage increases beyond the first setting V2 that is higher than the reference voltage, the control section 12 may also instruct the focus servo section 11 to start the closed loop control.

The first and second examples described above may be used in combination. Supposing one side of the optical disc 6 to be irradiated with the light beam is called the "front side" and the other side "reverse side", the first example may be adopted when the focal point is shifted from the front side toward the reverse side with respect to the storage layer of the optical disc 6. On the other hand, if the focal point is shifted from the reverse side toward the front side, the second example may be adopted.

Hereinafter, the first example will be described with reference to FIG. 5.

Portions (a) and (b) of FIG. 5 show the waveforms of the focus error signals FE1 and FE2, respectively. In FIG. 5, the abscissa represents the time and the ordinate represents the signal level. For the sake of convenience, the point in time when the focal point is formed right on the storage layer is shown as the reference time of zero.

First, before the reference time of zero, the open loop control is performed such that the focal point of the light is shifting from a distance toward the storage layer. The level of the focus error signal FE1 exceeds the reference value V1 at a time t0.

Next, at a time t1 later than the reference time of zero, the level of the focus error signal FE1 becomes lower than the reference value V2. At this point in time, the control section 12 starts the closed loop control. The signal for use in the closed loop control is the focus error signal FE2. In accordance with the instruction given by the control section 12, the focus servo section 11 drives the actuator 7 using the focus error signal FE2 as a control signal.

As a result, the focal point is shifted toward the zero-cross point (i.e., a signal value of zero) of the focus error signal FE2, goes zero at a time t2, and then oscillates with stability so as to keep up with the storage layer. Thus, it can be said that the focus control is stabilized at the time t2.

It should be noted that if the reference value V2 is defined to be zero in the first example described above and if the reference value V1 is defined to be zero in the second example described above, the control section 12 may switch into the closed loop control when the focus error signal FE2 decreases below the reference value V2 or increases beyond the reference value V1. If the reference values are set in this manner, the closed loop control can be substantially stabilized from the beginning.

Optionally, the reference values V1 and V2 may also be the peak values (i.e., the local maximum and local minimum values of the S-curve) of the focus error signal FE1. For example, the focus error signal FE1 may be acquired by having the focal point make a round trip and its local maximum and local minimum values may be acquired. Then, with the shifting direction of the focal point taken into consideration, the control section 12 may give an instruction to start the closed loop control when the focus error signal goes either below the local maximum value or beyond the local minimum value.

In this manner, by determining the timing to start the closed loop control using the focus error signal FE1 that has no pseudo-peaks, the open loop control can be performed just as intended and with stability without being affected by pseudo-peaks that may be present in the focus error signal as a control signal.

Embodiment 2

FIG. 6 shows a configuration for an optical disc drive 200 according to a second preferred embodiment of the present invention. In FIG. 6, any component having substantially the same function as the counterpart of the optical disc drive 100 of the first preferred embodiment described above is identified by the same reference numeral and the description thereof will be omitted herein.

Thus, only the components of the optical disc drive 200 that are different from their counterparts of the optical disc drive 100 shown in FIG. 1 will be described.

The signal computing section 10 outputs a first focus error signal FE1 representing the focus error of the light beam spot of the main beam and a second focus error signal FE2 obtained by subjecting the signals representing the focus errors of the light beam spots of the main and sub-beams to a predetermined computation.

Just like the control section 12 of the first preferred embodiment described above, the control section 18 also determines the timing to start the closed loop control using the focus error signal FE1. And the control section 18 instructs the focus servo section 17 to use the focus error signal FE1 as a control signal right after the modes of control have been changed from the open loop control into the closed loop control but to use the focus error signal FE2 as a control signal once the closed loop control has stabilized. The closed loop control system may be regarded as stabilized when the focus error signal FE1 goes zero (at the time t2 shown in portion (a) of FIG. 5) right after the closed loop control has been started, for example. In this manner, the focus error signal FE1 can be switched into the focus error signal FE2 and high precision control can be started at an early stage.

Just like the control section 12 of the first preferred embodiment described above, the control section 18 may also be implemented as a dedicated or general-purpose processor.

In accordance with the instruction given by the control section 18, the focus servo section 17 changes the modes of control from the open loop control into the closed loop control using the focus error signal FE1 as a control signal. Thereafter, following the instruction given by the control section 18, the focus servo section 17 switches the control signals to use from the focus error signal FE1 into the focus error signal FE2 to perform a focus servo operation.

The optical disc drive 200 of this preferred embodiment determines the timing to change the modes of control from the open loop control into the closed loop control using the focus error signal FE1 with no pseudo-peaks, and may operate just like a conventional optical disc drive that does not use both of the two focus error signals FE1 and FE2, i.e., uses only the focus error signal FE1. And since the focus error signals are changed into FE2 after the closed loop control operation has stabilized, a high precision focus servo operation can be performed in the steady state.

Besides, the focus error signal FE1 is selectively used as a control signal to determine the timing to start the closed loop control. That is why it will be effective if, just like the control section 12 of the first preferred embodiment described above, the control section 18 is designed to compare the focus error signal FE1 to a predetermined setting and instruct the focus servo section 17 to start the closed loop control based on a result of the comparison. Alternatively, it will also be effective if the control section 18 is designed to compare the focus error signal FE1 as a control signal to two settings V1 and V2 and instruct the focus servo section 17 to start the closed loop control operation based on a result of the comparison.

As described above, according to this preferred embodiment, the control signals are changed before and after the closed loop control gets stabilized, thereby getting the closed loop control operation done as well as the conventional one without decreasing the precision of the focus servo operation in the steady state.

In the foregoing description, the control section and the focus servo section, which are components of the present invention, have been described as individual functional blocks. Alternatively, each of these functions may be implemented as a single processing step of a process to be performed by a control system.

The control section 12 may be implemented as a computer that performs a general control over the overall operation of the optical disc drive 100. For that purpose, the control section 12 executes a computer program stored in a memory (not shown) and operates the signal computing section 10 and the focus servo section 11 of the optical disc drive 100 following the procedure of processing as defined in the computer program. Such a procedure of processing may be just as defined in the flowchart shown in FIG. 3, for example.

The computer program may also be stored in an optical storage medium such as an optical disc, a semiconductor storage medium such as an SD memory card, or a magnetic recording medium such as a flexible disk. In any case, the storage medium is loaded into the optical disc drive 100 and the program is read from the storage medium and then stored in the memory under the control of the control section 12. Optionally, the optical disc drive 100 may also get the computer program over a telecommunications line such as the Internet, not just via the storage medium 150.

INDUSTRIAL APPLICABILITY

The optical disc drive of the present invention can be used effectively as an optical disc drive that is designed to detect a focus using three beams and generate a focus error signal by performing a predetermined computation so as to minimize the intrusion of an optical modulation signal, caused by the guide groove on the track, in the focus error signal. The present invention is particularly effectively applicable to an optical disc drive, of which the detection optical system has a limited magnification to reduce the overall size of the drive.

The invention claimed is:

1. An optical disc drive comprising:
   a light source;
   an optical branching element for splitting light emitted from the light source into a main beam and at least one sub-beam;
   a condenser element for condensing the main beam and the sub-beam;
   a photodetector section including a main photodetector and a sub-photodetector to receive the main beam and the sub-beam, respectively, that have been reflected from a storage layer of an optical disc, each said photodetector having a number of photosensitive areas, each of which outputs a signal representing the intensity of light received there; and
   a computing section for generating a first focus signal, representing where the focal point of the main beam is located with respect to the storage layer, based on the signals of the respective photosensitive areas of the main photodetector, and also generating a second focus signal based on the signals of the respective photosensitive areas c of the main photodetector and the sub-photodetector, wherein the optical disc drive performs a first type of control in order to shift the focal point to a vicinity of the storage layer based on the first focus signal, and determines whether the focal point has reached the vicinity of the storage layer by comparing a level of the first focus signal to at least one reference value, and after determining that the focal point has reached the vicinity, then starts a second type of control in order to make the focal point moved from the vicinity to the storage layer.

2. The optical disc drive of claim 1, further comprising:

a control section for comparing the level of the first focus signal to the at least one reference value and giving an instruction to change into the second type of control based on a result of the comparison; and a focus servo section for changing the types of control to perform from the first type into the second type, and vice versa, in accordance with the instruction.

3. The optical disc drive of claim 2, wherein the at least one reference value includes a first reference value and a second reference value that is smaller than the first reference value, and wherein the control section compares the level of the first focus signal to each of the first and second reference values.

4. The optical disc drive of claim 3, wherein when the level of the first focus signal that has once exceeded the first reference value decreases below the second reference value, the control section gives an instruction to change into the second type of control.

5. The optical disc drive of claim 3, wherein when the level of the first focus signal that has once decreased below the second reference value exceeds the first reference value, the control section gives an instruction to change into the second type of control.

6. The optical disc drive of claim 1, wherein the first focus signal is a focus error signal that is generated based on signals output by the main photodetector, and the second focus signal is a focus error signal that is obtained by adding the first focus signal to a signal that is obtained by multiplying a predetermined constant by a focus error signal generated based on signals output by the sub-photodetector.

7. The optical disc drive of claim 1, further comprising an actuator for moving the objective lens, wherein the first type of control is an open loop control in which the first focus signal is monitored while the objective lens is being moved by the actuator, and the second type of control is a closed loop control in which the actuator is controlled to move the objective lens so as to make the focal point keep up with the storage layer based on the second focus signal while the objective lens is being moved by the actuator.

8. The optical disc drive of claim 1, wherein after the focal point has reached the storage layer, the optical disc drive performs a control for making the focal point keep up with the storage layer continuously based on the second focus signal.

* * * * *

UNITED STATES PATENT AND TRADEMARK OFFICE
CERTIFICATE OF CORRECTION

| | | |
|---|---|---|
| PATENT NO. | : 7,911,890 B2 | |
| APPLICATION NO. | : 12/066869 | |
| DATED | : March 22, 2011 | |
| INVENTOR(S) | : Arai et al. | |

It is certified that error appears in the above-identified patent and that said Letters Patent is hereby corrected as shown below:

Column 13, line 2, "areas c of" should read -- areas of --.

Signed and Sealed this
Twelfth Day of July, 2011

David J. Kappos
*Director of the United States Patent and Trademark Office*